United States Patent
Rayment et al.

(10) Patent No.: US 8,438,970 B2
(45) Date of Patent: May 14, 2013

(54) ROTISSERIE BASTING DRUM

(76) Inventors: Don Rayment, Kingston (CA); Cathy Chabrian, Victoria (CA)

( * ) Notice: Subject to any disclaimer, the term of this patent is extended or adjusted under 35 U.S.C. 154(b) by 561 days.

(21) Appl. No.: 12/717,378

(22) Filed: Mar. 4, 2010

(65) Prior Publication Data

US 2010/0224079 A1    Sep. 9, 2010

Related U.S. Application Data

(60) Provisional application No. 61/157,777, filed on Mar. 5, 2009.

(51) Int. Cl.
*A47J 37/10*    (2006.01)

(52) U.S. Cl.
USPC ............... 99/345; 99/347; 99/419; 99/421 H; 99/426; 99/427

(58) Field of Classification Search ............ 99/345, 99/347, 419, 421 R, 421 H, 427, 426, 450
See application file for complete search history.

(56) References Cited

U.S. PATENT DOCUMENTS

| 626,029 | A | * | 5/1899 | Mabee | 99/345 |
| 1,292,031 | A | * | 1/1919 | Parker | 99/345 |
| 1,460,248 | A | * | 6/1923 | Kott | 99/427 |
| 1,786,300 | A | * | 12/1930 | Harrison | 99/341 |
| 2,722,172 | A | * | 11/1955 | Garbo | 99/346 |
| 2,897,776 | A | * | 8/1959 | Black et al. | 118/13 |
| 4,355,569 | A | * | 10/1982 | Sage | 99/427 |
| 6,220,152 | B1 | * | 4/2001 | Baldwin et al. | 99/427 |
| 7,500,428 | B2 | * | 3/2009 | Backus et al. | 99/427 |

* cited by examiner

*Primary Examiner* — Benjamin Layno
(74) *Attorney, Agent, or Firm* — George Thomson

(57) ABSTRACT

A rotisserie self-basting drum is designed to allow a user to cook rotisserie style meat at home without using a large, commercial built oven. The device may be made of stainless steel or other suitable material. A series of channels are formed into a shell to collect cooking juices that fall from a cooking food item during a cooking cycle. The rotating drum transports the juices from the bottom of the food item to the top of the food item where the juices spill from the channels onto the food item for basting. The drum may be in one section or two sections latched together that slide over a spit containing the food item.

9 Claims, 9 Drawing Sheets

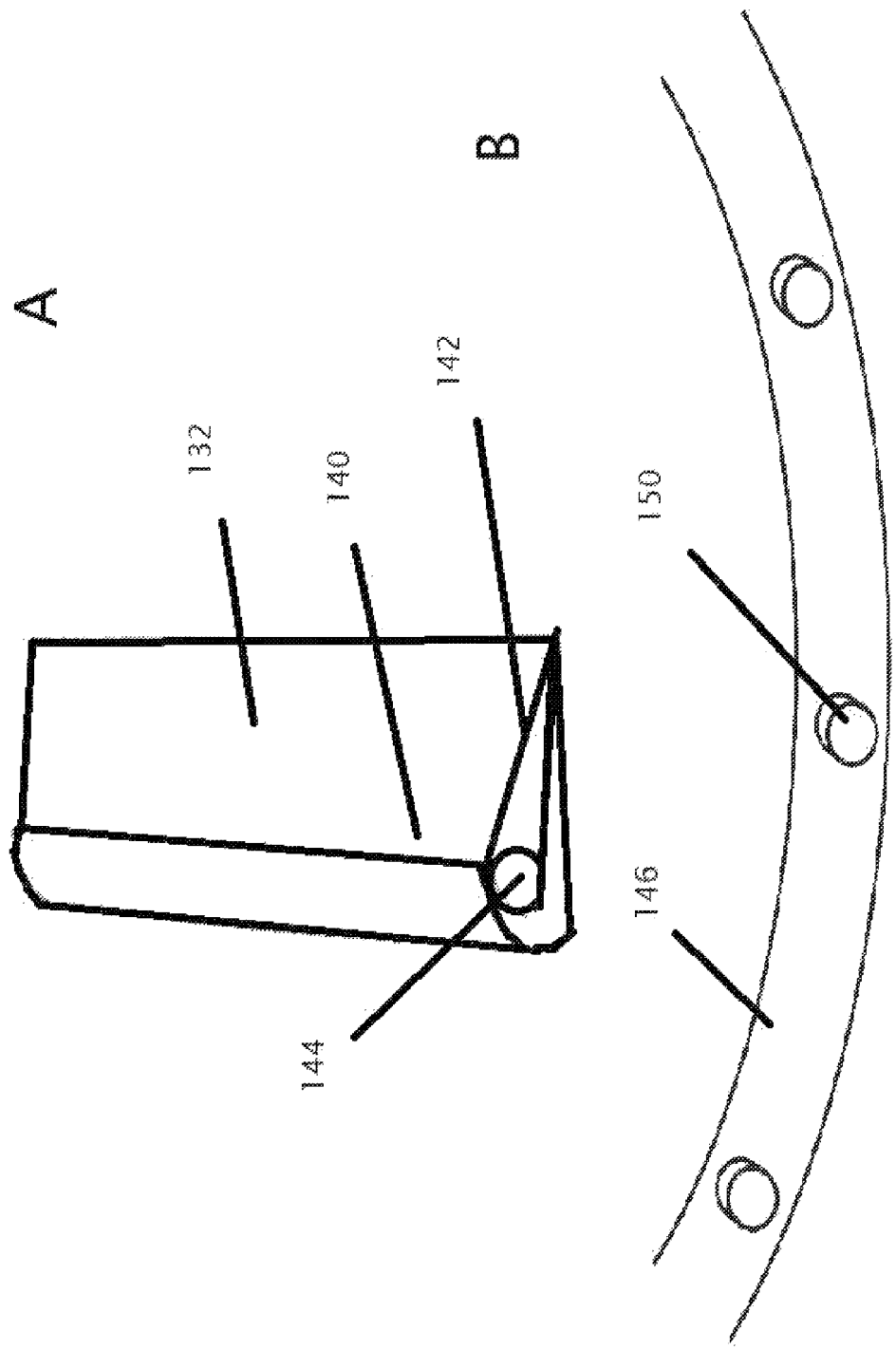

ROTISSERIE BASTING DRUM

CROSS-REFERENCE TO PREVIOUSLY FILED APPLICATIONS

This patent application claims the benefit of U.S. Provisional Patent Application No. 61/157,777 filed on Mar. 5, 2009.

FIELD OF THE INVENTION

The present invention relates to the field of apparatus for food and beverages and specifically those for preparing food. In particular the present invention relates to a rotisserie basting drum that can be used on a bar-b-q for roasting and cooking food items.

BACKGROUND OF THE INVENTION

Bar-b-q grills and ovens are often equipped with motor driven rotisserie spits. The food is mounted onto the spit and then placed over the hot grill. As the food cooks the spit is rotated to give an even heat distribution over the food. The food releases juices as it cooks. In a conventional rotisserie oven or bar-b-q these juices fall into the grill causing flaming and burning of the food. Furthermore, the food desiccates on the grill because the flavorful juices are not retained. Food basting is used to ensure that cooking juices are returned to the food to maintain a juicy texture in the food and food flavor. In a conventional oven, this means opening the oven door and manually using a basting tool to suction juices from the bottom of the baking pan and then release the juices over the food. This causes variations in the temperature of the oven as the door opens and closes, the risk of a serious burn and an inconsistent basting process. In a bar-b-q, it is necessary to lift the hood of the bar-b-q thereby causing a serious heat loss within the cooking chamber. Furthermore, since most rotisserie-type bar-b-q devices do not collect cooking juices for basting it is necessary to use a mixed basting fluid or marinating fluid to keep moisture in the food.

Therefore, there is a need for a rotisserie device that is able to self-baste the food while cooking without having to open the cooking chamber and disrupt the cooking process.

SUMMARY OF THE INVENTION

The present invention is a rotisserie basting drum designed to provide a constant stream of liquid to baste food items at a constant temperature throughout the cooking cycle. The present invention can also roast items by allowing them to move freely inside the drum in a gentle tumbling action. The rotisserie basting drum ensures flavorful and moist meats and vegetables. Foods such as chicken and potatoes may be crisp and evenly browned at home using the rotisserie basting drum. The drum of the present invention ensures that juices and fat from meats are collected in the drum and then dripped back onto the meat as the meat rotates on the spit. There is a constant flow of liquid throughout the entire process. This method produces the unique flavor and texture of commercially prepared rotisserie chicken.

In one embodiment of the invention, the rotisserie basting drum allows a user to cook rotisserie style meat at home without using a large, commercial built oven. In one embodiment of the invention the basting drum may be made preferably of stainless steel or other suitable material.

In another embodiment of the invention a cover may form a barrel or drum. The drum may be a single section or comprised of two or more sections that interlock and slide over a spit containing the food item.

In yet another embodiment of the invention channels are created in a longitudinal direction co-axial with the rotating rotisserie spit inside the drum to collect basting fluids. The invention may be manually operated or take advantage of a small motor with a programmable speed controller fixed to one end of the rotating spit.

One advantage of the invention is that it is easy to use and easy to clean and can be used with most consumer rotisseries.

In operation, the food is affixed to the rotisserie spit. In the two piece embodiment, the basting drum slides on in two parts from both ends of the food article and attaches to itself by a friction fit. The drum parts are fixed to the spit and so they rotate along with the item on the spit. As the item heats up and generates basting fluids, the channels that run the length of drum collect this liquid and carries it up until it reaches a higher point in rotation. The liquid can then drip back down onto the food item. The material in the drum may also retain heat from the flame of the rotisserie and radiate it inside the drum, helping to maintain a constant cooking temperature. At the same time it protects the food item from the scorching effects of an open flame. In order to roast items without a spit, food is placed into the drum. As the drum rotates, items such as potatoes, carrots, and more are able to gently roll over with the help of the edge or edges of the channels. Cooking is complete when the food is cooked evenly.

In one embodiment of the invention, the drum is a single piece mounted on the rotating spit. Food is inserted into the drum by removing one end cover and placing the food item on the spit. The end cover of drum is then replaced.

BRIEF DESCRIPTION OF THE FIGURES

FIG. 9 is a view of the arrangement to fasten the disposable shell to the rim.

DETAILED DESCRIPTION OF PRESENTLY PREFERRED EMBODIMENTS

Single-Piece Basting Drum

Figure 1:
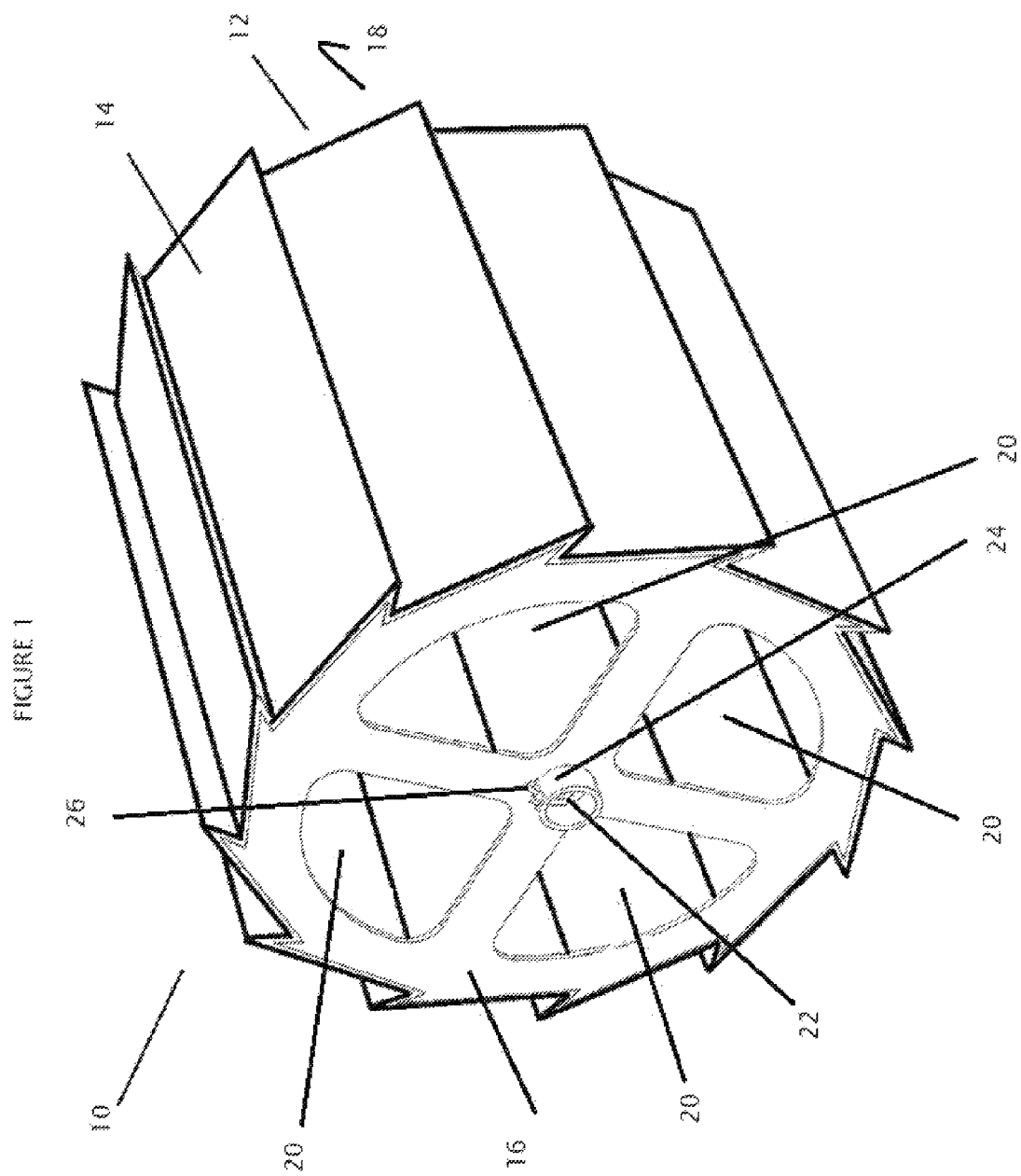
FIG. 1 is a side perspective view of a first embodiment of the rotisserie namely a single-piece basting drum.

Referring to FIG. 1, there is shown a perspective side view of the rotisserie single-piece basting drum embodiment is illustrated as 10. The drum comprises an outer shell 12 having an outer surface 14. The shell 12 is supported on its left end by rim 16 and on its right end by rim 18 (not shown). The rim need not be a solid construction and so to save weight and manufacturing costs a significant amount of rim material is removed as shown by the openings 20. The middle of the rim includes an aperture 22 for receiving the rotisserie spit (not shown). The aperture has a collar 24 fixed to the periphery of the aperture to support the drum 10 on the rotisserie spit. To fix the drum 10 to the rotisserie spit there is a screw 26 through the collar 24 that can be tightened against the spit so that the drum does not move relative to the spit. In other embodiments of the invention the screw can be replaced with a spring clip or other suitable device to exert a restraining force on the spit so that drum and spit rotate as one. The right side of the drum includes a rim 18 so that the drum is supported on the rotisserie spit at both of its left and right ends. Preferably the right side rim is removable from the drum so that the food can be placed on the spit and then enclosed within the drum by replacing the right rim 18 back onto the spit. The tightening screw on the collar of the right side rim is then tightened to ensure that it remains in place relative to the drum shell. To withstand the heat generated within the cooking chamber of a bar-b-q the shell, the left rim and the right rim are manufactured from a suitable metallic material and preferably stainless steel.

Figure 2:
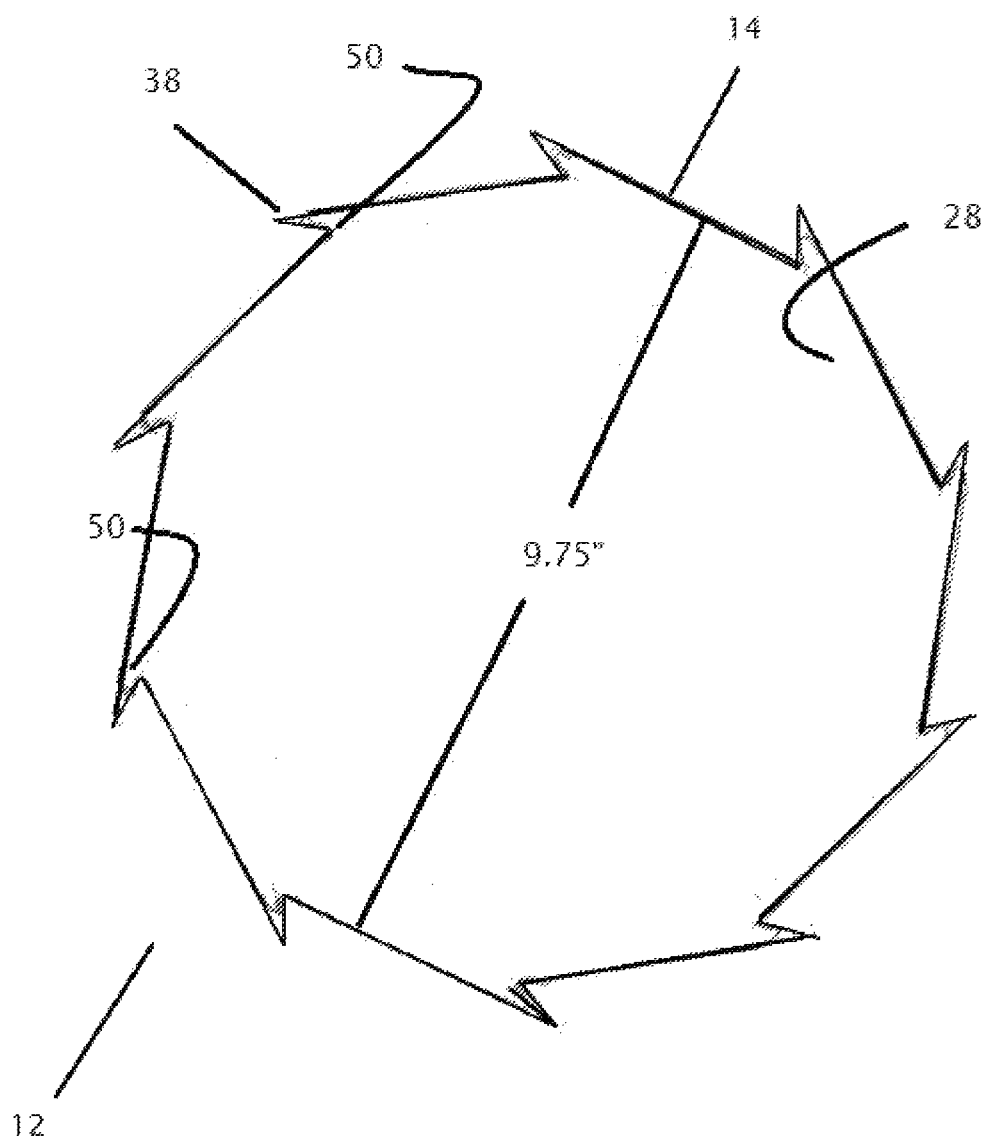
FIG. 2 is a left side view of the shell of the first embodiment shown in FIG. 1.

Referring now to FIG. 2, there is shown a side profile view of the shell 12. The shell has an outer surface 14 and an inner surface 28. The diameter of the shell is about 9.75 inches and is dimensioned to avoid direct contact with the cooking grill.

Figure 3:
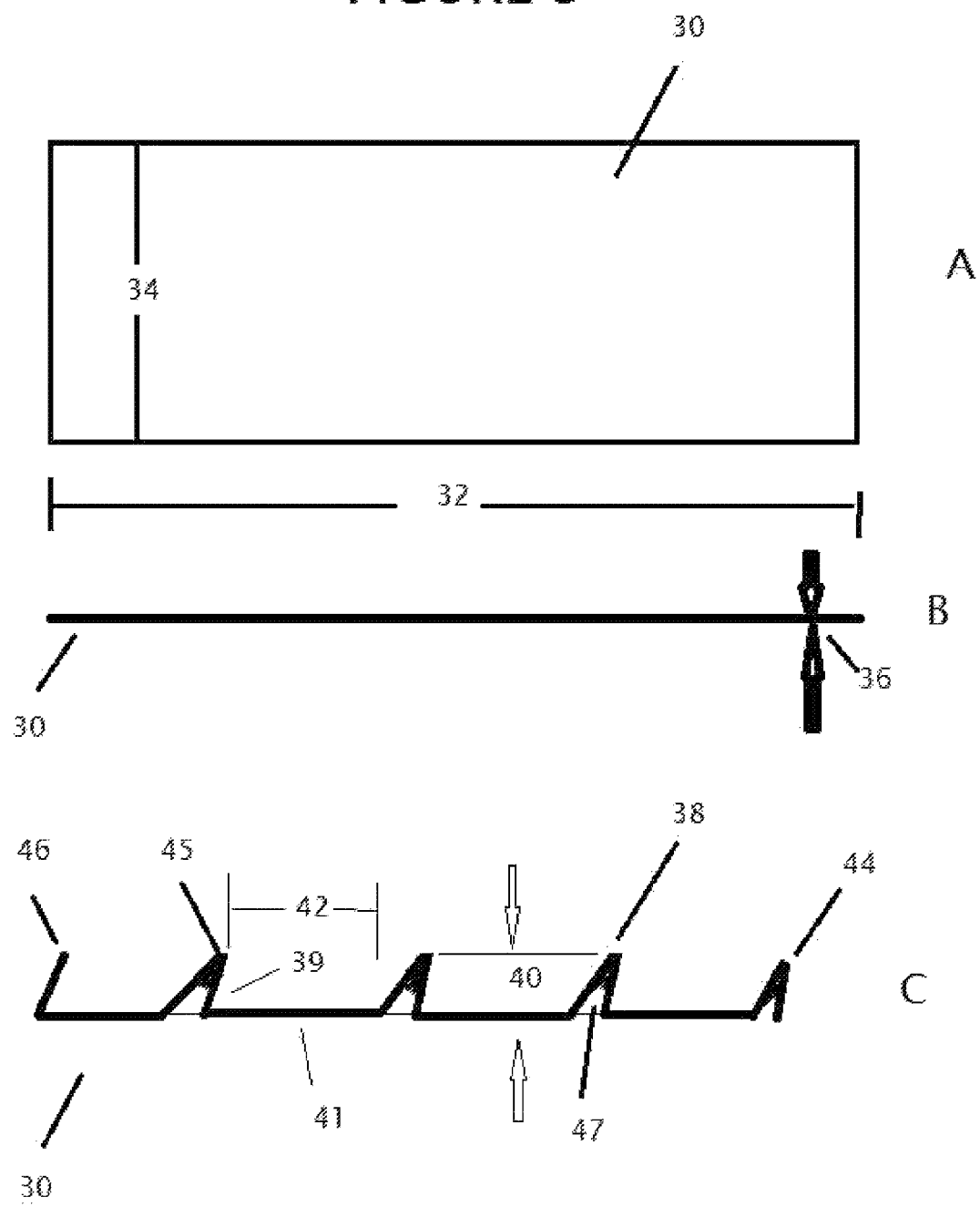
FIGS. 3 A, B and C are views of the shell and its construction of the first embodiment of the invention.

Referring to FIG. 3 view "A" the shell is formed from a single rectangular strip of material 30 having suitable length 32 and width 34 dimensions. In view "B" which is a edge-on view the material has a suitable gauge or thickness 36 so that it can be formed as shown in view "C" and retain that shape. The projections 38 are formed into the material by a bending process known in the art. Each of the projections 38 has a uniform height 40 and they are equidistantly 42 spaced along the length of the material 32. The projections are angled 39 from the adjacent flat surface 41 to the channels can transport fluids to the top of the rotation cycle. The strip of material is then rolled into the shape shown in FIG. 2. To close the strip into a circular configuration, right end projection 44 is placed over left end projection 46 and fixed in place by suitable fixing means such as welding. In a preferred embodiment of the invention the material used for the shell 12 is preferably stainless steel. The ends 45 of the projection may be blunted to avoid a cutting hazard. Furthermore, the interior of the channels 47 may be curved so make them easier to clean and avoid the accumulation of bacteria and other contaminants. The inside surface of the drum can be coated with an anti-stick surface compound to make it easier to clean.

Figure 4:
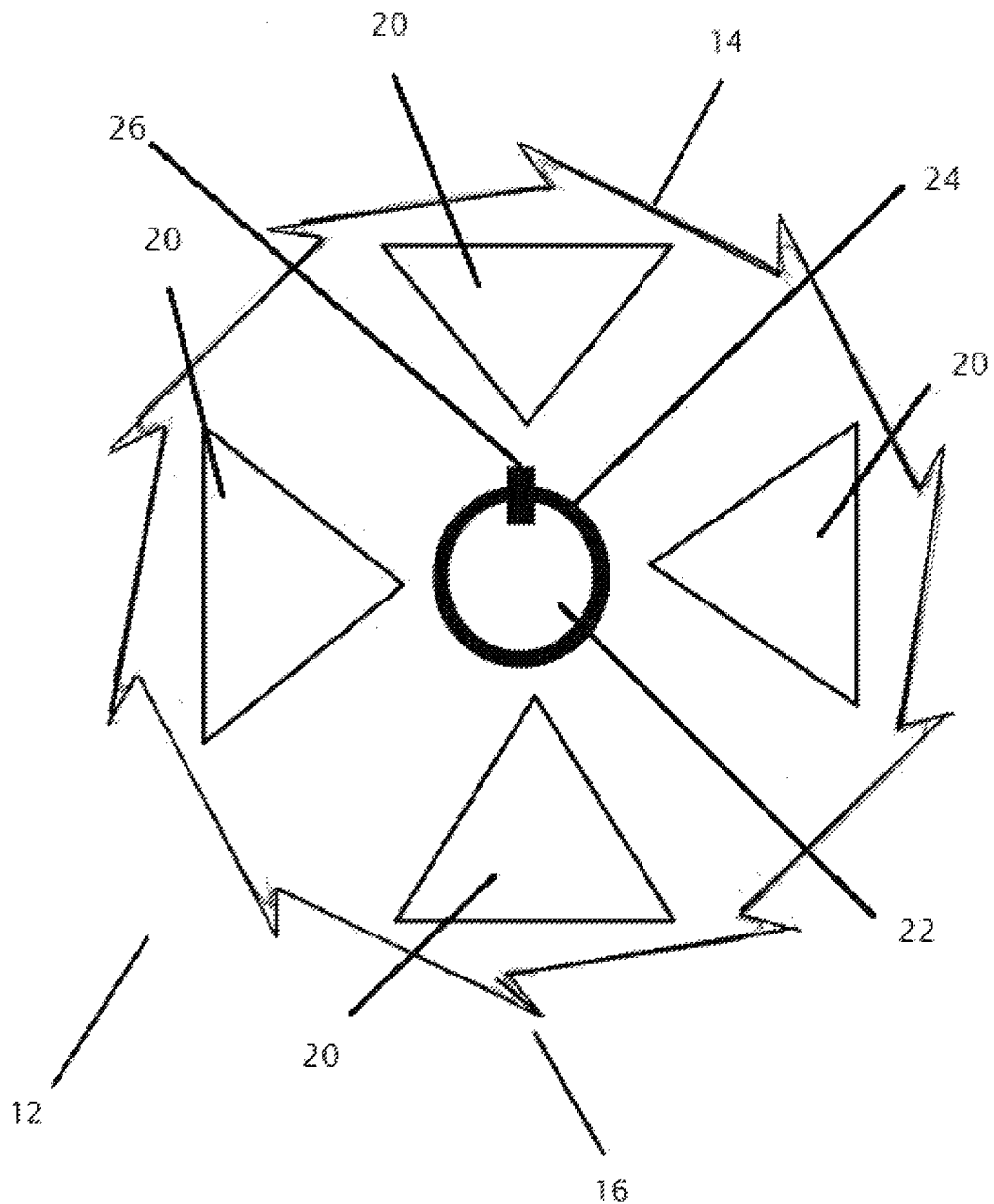
FIG. 4 is a view of the left side rim of the first embodiment of the invention.

Referring now to FIG. 4 there is shown one embodiment of the left side rim 16. The right side rim 18 would be compatible with the left side rim. The rim comprises an solid blank of material which is preferably stainless steel. Openings 20 are removed from the blank by cutting them out using a suitable method such as high pressure water. Similarly centre hole 22 is removed.

Collar 24 is welded around the circumference of the centre hole 22 so that the drum is supported on the spit. Within collar 24 there is a tightening screw 26 to fix the drum to the spit so that they rotate together.

Referring to FIGS. 1, 2 and 4 the profile of the end rim and of the shell are identical so that the when the end rim is inserted into the end of the shell, it is a tight fit. The left side rim 16 is permanently fixed into place on the shell 12 so that the cooking fluids do not leak out of the drum between the shell inner surface 28 and the rim. The shell is fixed to the rim by welding or some similar process so as to create a fluid tight seam between them. Similarly on the right side of the drum, the rim 18 is temporarily fixed to the drum by a friction fit so that the right side rim can be removed to insert a food item for cooking. The right side rim collar has a locking screw identical to item 26 on rim 14 so that the right side rim can be tightly held in place.

Referring to FIG. 2, the side-on view of the shell 12 illustrates the protrusions 38 equally spaced around the circumference of the outer surface 14 of the shell. On the inner surface of the shell there will be formed a plurality of parallel channels 50 equally spaced around in the inside surface 28 of the shell. There preferred embodiment has at least one such channel. The channels will run from one end of the drum to the other end of the drum. During cooking operations, a food item on the rotisserie spit will produce cooking fluids which will drip from the food item to the bottom of the drum. The cooking fluids will collect in the channels 50. As the drum is rotated the channels will carry the fluids upwards to the top of the rotation. The fluids will then spill out of the channels at the top of the rotation and onto the cooking food item. In this manner, the fluids can be used to continually baste the food item. Hence the drum becomes a self-basting cooking utensil.

Two-Piece Basting Drum

Figure 5:
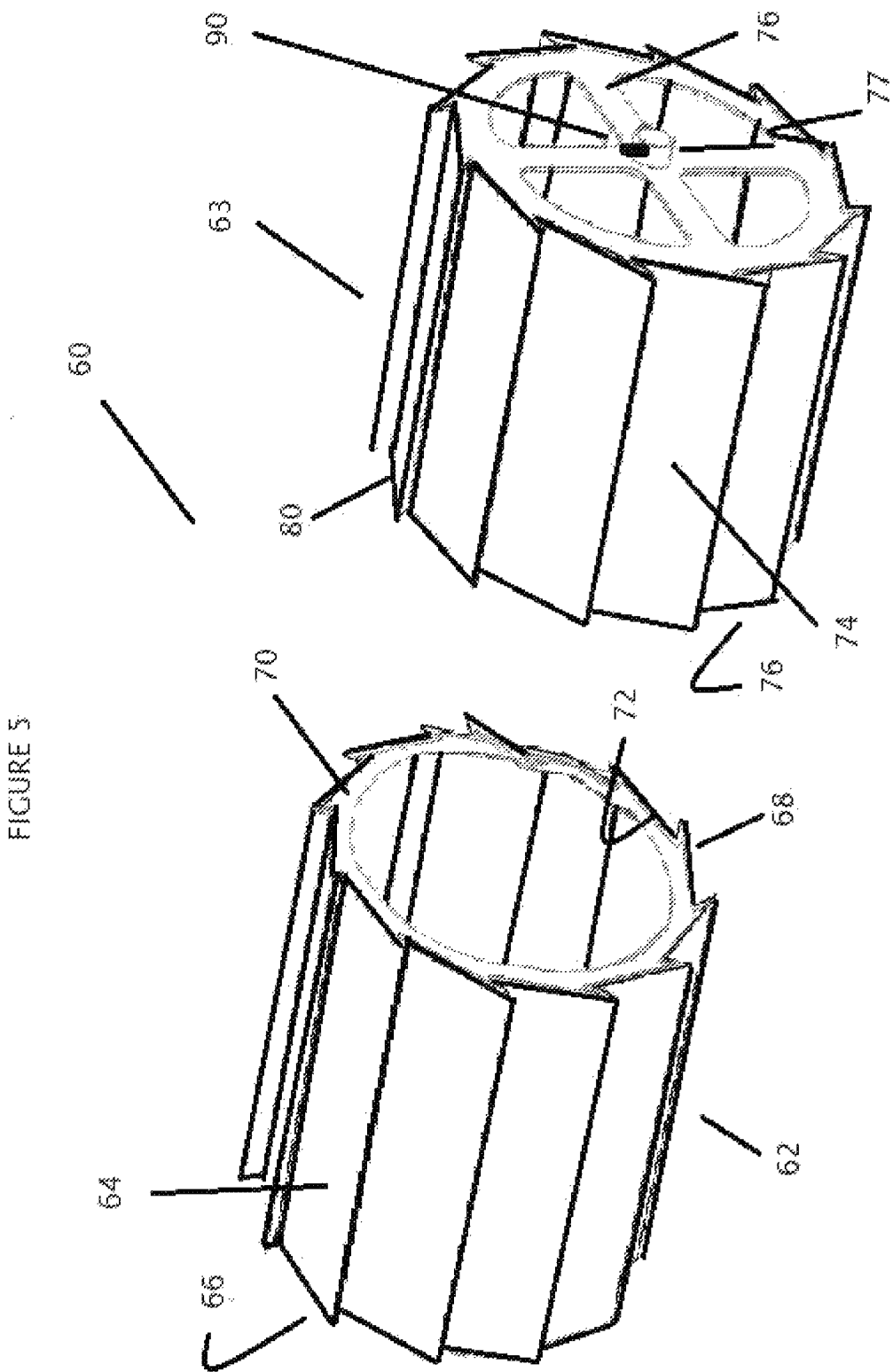
FIG. 5 is a view of a second embodiment of the invention namely a two-piece basting drum.

Referring now to FIG. 5, there is shown a second embodiment of the invention in a perspective side view. The second embodiment 60 is a two-piece basting drum comprising a left-side piece 62 and a right-side piece 63. The left-side piece 62 comprises a shell 64 and a left-side rim 66 (not shown). Rim 66 is similar to rim 16 in FIG. 1. The right-side end 68 of the shell 64 is supported by a flange 70 that is permanently fixed at a position slightly 72 inside of the right-side end 68. Shell 64 and rim 66 are manufactured from materials using the process discussed above. The flange 70 is also preferably made from stainless steel and cut from a blank. The flange would be fixed in position using a suitable welding process so that there is a liquid tight seal between it and the shell. The right-side piece 63 comprises a shell 74 and a rim 76 for supporting the right-side end of the shell. The rim 76 is positioned 77 slightly inside of the right-side end 79 of the shell 74. It is fixed in a fluid tight relationship with the shell using a suitable welding method. Rim 76 is similar in design and manufacture to rim 16 shown in FIG. 1. The left-side end 80 of the shell 74 is supported by a flange 76 (not shown) that is similar to the flange 70. Flange 76 is inset slightly from the left-side end 80 of the shell and is fixed in position in a leak tight relationship with the shell by suitable welding methods. The two drum-halves 62 and 63 are brought together so that the right-side end 68 of shell 64 slightly overlaps the left-side end 80 of shell 74 so that the flange 76 and flange 70 abut each other. The overlapping fit may be held in place by a friction fit and the two locking screws 90 on rim 76 and 92 (not shown) on rim 66 (not shown). In other embodiments, the two half drums may be held temporarily together during the cooking cycle by a latch mechanism, a hook and eye, or a tie twist.

Figure 6:
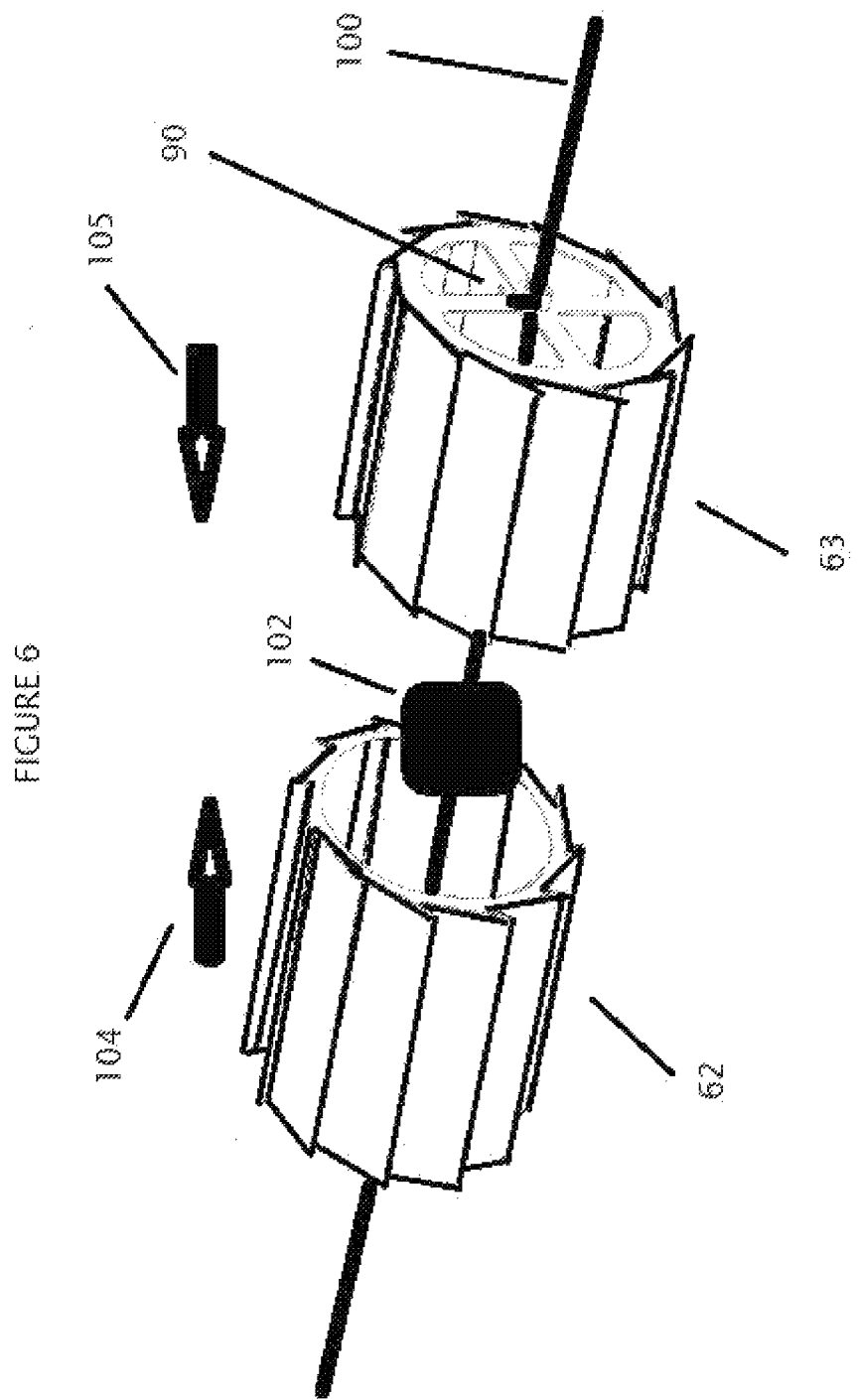
FIG. 6 is a side perspective view of the two piece embodiment of the invention mounted on a rotisserie spit.
Figure 7:
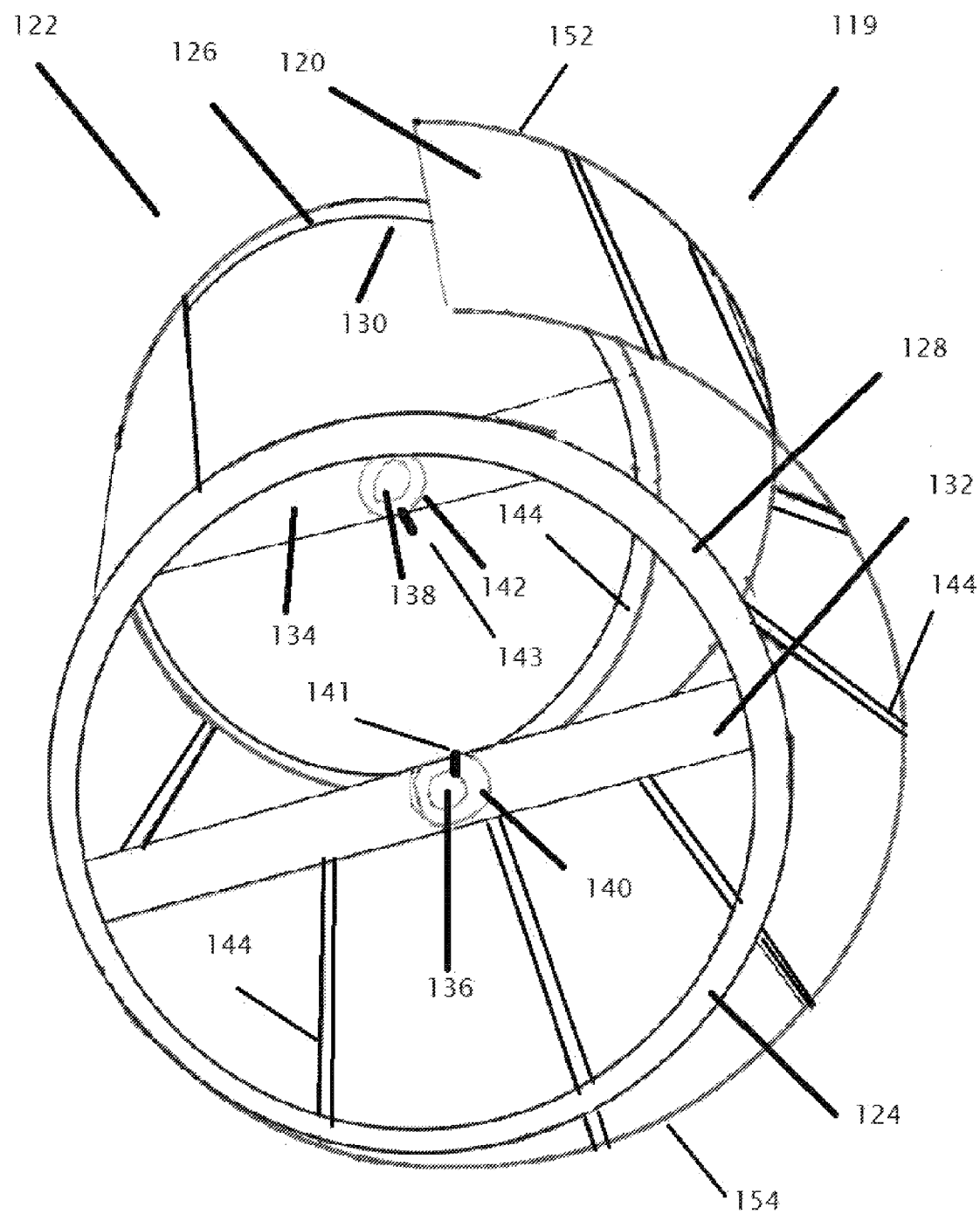
FIG. 7 is a view of another embodiment of the invention illustrating a disposable shell disposed on the outside of the rims.

Referring to FIG. 6, in operation, the right-side drum half 63 is placed on the rotisserie spit 100 and the locking screw 90 tightened to hold the right-side drum half in place. Then the food article 102 is placed on the spit 100 so that it is within the drum enclosure. The left-side drum 62 half is then placed on the spit 100 and moved into an engagement with the right-side drum half using a friction fit previously discussed and shown by arrows 104 and 105. The second locking screw 92 (not shown) is then tightened to lock the drum onto the spit and in a fixed position with respect to the right-side drum half. Once the cooking cycle commences, the self-basting process will take place as previously discussed. The advantage of the two-piece drum is that larger and longer objects can be placed onto the spit and enclosed by the drum for self-basting cooking Disposable Shell Referring to FIG. 7 there is shown another embodiment 119 of the invention which is a single-piece drum having a disposable shell disposed on the outside of the rims. The shell 120 is manufactured from heavy duty aluminum of sufficient gauge to withstand cooking temperatures and remain resilient. The drum 122 comprises a first rim 124 and a second rim 126. The rims 124 and 126 comprise a circular channel piece 128 and 130 and a cross-piece 132 and 134 to support the circular channel piece. The cross-pieces are apertured 136 and 138. Each aperture has a collar 140 and 142 welded to its periphery to support the rim on the spit. Each collar includes a locking screw 141 and 143 which will tighten against the spit to hold the rims in position on the spit and the shell within the channels of the channel pieces. The shell 120 includes a plurality of channels 144 pressed into its inside surface. The channels collect cooking juices from a cooking food item at the bottom of the drum and then transport the juices to the top of the drum whereupon they fall onto the cooking food item in a self-basting fashion. The edges of the shell 152 and 154 are placed inside of the channels 146 and 148 (not shown) of the channel pieces 128 and 130 in a tight press fit. The shell 120 is ultimately disposable but can be washed and reused multiple times before it wears out.

Figure 8:
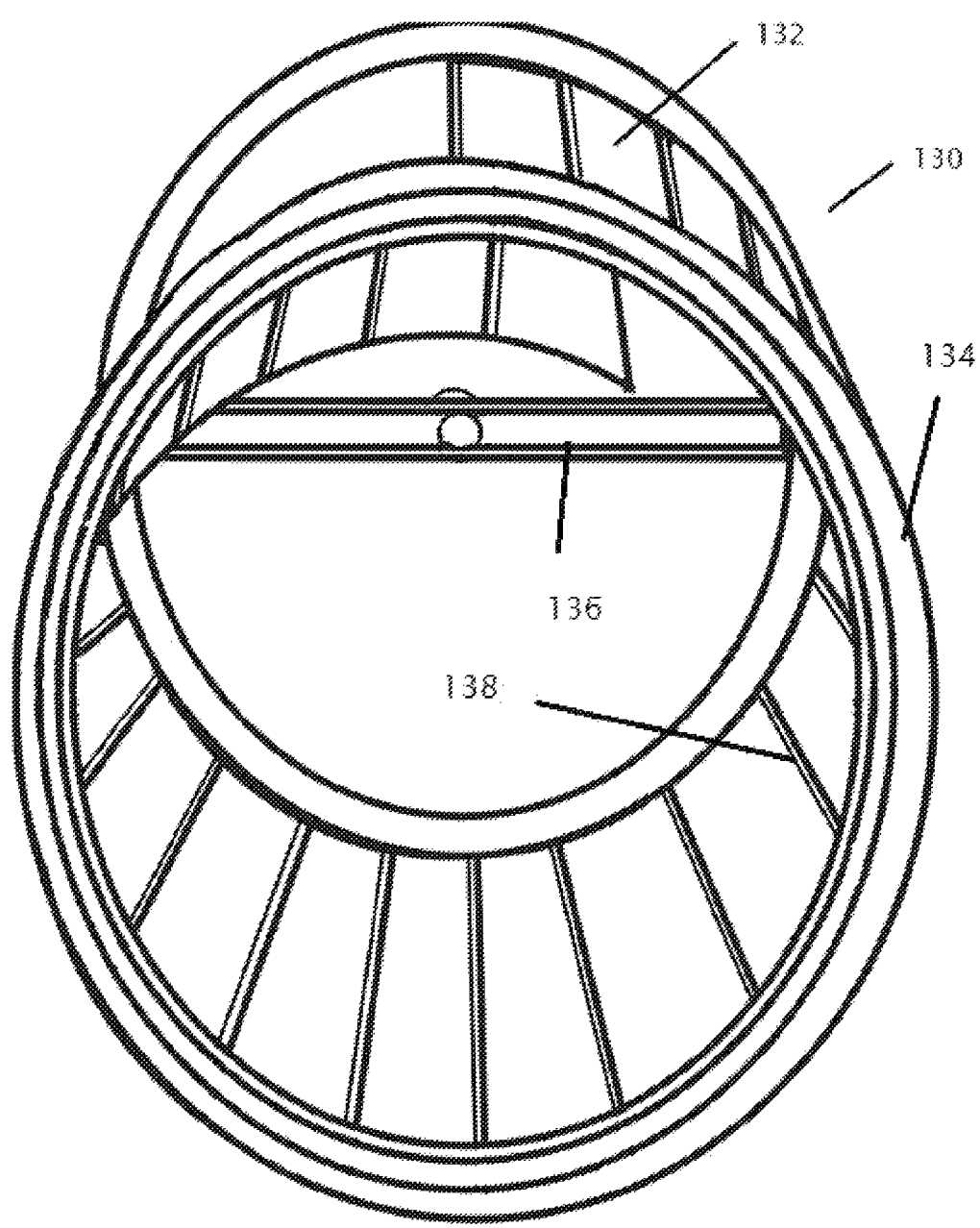
FIG. 8 is a view of another embodiment of the invention illustrating a disposable shell disposed on the inside of the rims.

Referring to FIG. 8, there is shown another embodiment of the invention 130 wherein the shell 132 is disposed on the inside of the rims 134 and 136. The collection channels 138 are formed into the disposable shell 132.

Referring to FIG. 9 there is shown in View "A" a view of a section of the shell 132 of one embodiment of the invention. Channel 140 is formed as previously discussed. View "B" is a view of the inside of the rim B and illustrates the disc-shaped projections 150 on the inside periphery 148 of the rim. The end of the channel 142 is dammed as shown to prevent leakage of cooking fluids from the ends of the channel. Within each of the dams is a disc-shaped cavity 144. In view "B" there is shown a section of a rim 148 having a number of disc-shaped projections 150 equally spaced around the inside circumference of the rum. The disc-shaped cavities 144 receive the disc-shaped projections 150 in a friction press fit. In this manner the disposable shell is temporarily fixed to the rims.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A rotisserie self-basting drum for temporary mounting to a rotatable rotisserie spit having a rotation axis; wherein, said self-basting drum surrounds a food item placed on said spit; and wherein the self-basting drum comprises an outer shell for enclosing the food item, a left end permanently enclosed by a left-side end piece and a right end temporarily enclosed by a removable right-side end piece; and further wherein said left-side end piece and said right-side end piece are axially mounted to the spit and temporarily fixed thereto by fixing means for supporting and rotating the drum a suitable distance from a cooking heat source: and wherein:
   a) the drum comprises a single strip of material curled about said rotation axis and comprising a first end, a second end, a length, a width, an outside surface, an inside surface and a suitable thickness for withstanding cooking heat;
   b) said single strip of material further comprises at least one folded projections: and,
   wherein, said at least one projection has equal heights: and,
   c) the at least one projection has an inverted "V" shape on said outside surface thereby creating an at least one "V" shaped channel on said inside surface.

2. The drum of claim 1 wherein the at least one inverted "V" projection is angled to an adjacent horizontal surface at an angle suitable for containing cooking fluids and transporting said fluids.

3. The drum of claim 2 wherein said first end of the strip is curled about the rotation axis to meet the second end of the strip and is permanently fixed thereto thereby forming said basting drum outer shell.

4. The drum of claim 3 wherein the drum outer shell left side and right side have profiles congruous with the left side end piece and the right side end piece so that upon placement of the left side end piece a short distance into the left side of the drum and upon placement of the right side end piece a short distance into the right side of the drum there is a tight friction fit between them.

5. The drum of claim 4 wherein the left side end piece is permanently secured into the left side of the drum in a supporting relationship and forming a leak-free seal and the right side end piece is temporarily secured into the right side of the drum in a supporting relationship by a friction fit and forms a leak-free seal.

6. The drum of claim 5 wherein the left side end piece forms a left side supporting rim for the drum and comprises a first centred aperture surrounded by a first collar projecting outward from said left side rim: wherein, said first collar is apertured to accept a first mounting screw for temporarily mounting said left rim to the spit.

7. The drum of claim 5 wherein the right side end piece forms a right side supporting rim for the drum and comprises a second centred aperture surrounded by a second collar projecting outward from said right side rim; wherein said second collar is apertured to receive a second mounting screw for temporarily mounting the second rim to the spit.

8. The drum of claim 1 wherein the at least one "V" shaped channel within said drum inside surface has a rounded inside bottom surface so that they may be easily cleaned and remain contaminant free.

9. The drum of claim 8 wherein the at least one "V" shaped channel located below said food item collect fluids from the food item during a cooking cycle and transport said fluids to a position above the food item so that the fluids fall by gravity onto the food item thereby basting the food item.

* * * * *